(12) United States Patent
Lien

(10) Patent No.: US 8,028,877 B2
(45) Date of Patent: Oct. 4, 2011

(54) CONNECTION DEVICE FOR CONNECTING BAG TO SIDE OF BICYCLE CARRIAGE RACK

(76) Inventor: Chien Ping Lien, Taipei Hsien (TW)

(*) Notice: Subject to any disclaimer, the term of this patent is extended or adjusted under 35 U.S.C. 154(b) by 753 days.

(21) Appl. No.: 12/216,841

(22) Filed: Jul. 11, 2008

(65) Prior Publication Data
US 2010/0006721 A1  Jan. 14, 2010

(51) Int. Cl.
*B62J 11/00* (2006.01)
*B62J 9/00* (2006.01)

(52) U.S. Cl. ........ 224/417; 224/419; 224/431; 224/449; 224/459; 224/560

(58) Field of Classification Search .................. 224/416, 224/417, 419, 424–425, 430–431, 437–439, 224/449, 458–459, 543, 545, 553, 555, 560; 410/104
See application file for complete search history.

(56) References Cited

U.S. PATENT DOCUMENTS

| 5,435,471 A * | 7/1995 | Chuang ......................... 224/419 |
| 5,579,971 A * | 12/1996 | Chuang ......................... 224/430 |
| 6,702,505 B1 * | 3/2004 | Nutto et al. ................ 403/322.4 |
| 7,234,619 B2 * | 6/2007 | Hicks et al. .................... 224/547 |

* cited by examiner

*Primary Examiner* — Justin Larson
*Assistant Examiner* — Adam Waggenspack
(74) *Attorney, Agent, or Firm* — Bacon & Thomas, PLLC

(57) ABSTRACT

A connection device for connecting a bag to a bicycle carriage rack includes a transverse bar connected to a back board of the bag and two hook units are connected to the transverse bar. Each hook unit includes a flexible plate and a stud extends from the flexible plate. The stud can be engaged with one of positioning holes defined in the transverse bar by pulling the flexible plate to position the hook unit to the transverse bar. The hook units hook to a side of the bicycle carriage rack. A lower part is connected to a lower portion of the back board and has a second groove with which a sliding member is slidably engaged. Each sliding member has an I-shaped member which has one end pivotably engaged therewith and the other end of the I-shaped member is engaged with a support leg of the carriage rack.

5 Claims, 7 Drawing Sheets

CONNECTION DEVICE FOR CONNECTING BAG TO SIDE OF BICYCLE CARRIAGE RACK

FIELD OF THE INVENTION

The present invention relates to a connection device for removably connecting a bag to a side of a bicycle carriage rack.

BACKGROUND OF THE INVENTION

A conventional connection device for connecting a bag to the carriage rack of a bicycle generally includes a base which is connected to the carriage rack and the bag is connected to the base at its bottom. Two fixed hooks extend from a side of the base and a movable hook is connected on the other side of the base. The fixed hooks and the movable hook are respectively hooked with the carriage rack and the bottom of the bag. Two support hooks are connected to a side of the movable hook and cooperated with two fixed hooks so as to perform the support legs of the bag. The base includes drain holes such that rain drops are not trapped in recessed areas of the base. The conventional connection device is designed to connect small bag to the bicycle and the bag is designed to be position on the top of the carriage rack.

A conventional connection device for connecting a bag to a side of the bicycle and there are two fixed hooks on the base of the bag so as to hook to the side of the carriage rack. A movable hook is slidably connected to the lower end of the base and hooked to a support rod of the carriage rack. However, the positions of the fixed hooks are not adjustable and might not be suitable for some carriage rack. The fixed hooks and the movable hook protrude from the back board of the bag so that the bag cannot be used as a backpack.

The present invention intends to provide a connection device for connecting a bag to a side of a bicycle carriage rack and the bag has a smooth back and can be used as a backpack.

SUMMARY OF THE INVENTION

The present invention relates to a connection device for connecting a bag to a side of a bicycle carriage rack and the device includes a back board fixed to a back of a bag and a transverse bar is connected to an upper portion of the back board. Two hook units are connected to the transverse bar and each have a guide portion, a hook portion, a torsion spring and a pin. The guide portion includes two first grooves defined in a first side thereof and the two first grooves are located at an upper position and a lower position of the guide portion. Two flanges on the transverse bar are engaged with the first grooves. A lower part is connected to a lower portion of the back board and a second groove is defined in the lower part. A plurality of positioning notches are defined in a first inside of the second groove and a T-shaped slot is defined in a second inside of the second groove. A sliding member is slidably engaged with the second groove and an I-shaped member has a first end pivotably connected to the sliding member and a second end of the I-shaped member can be pivotable about the first end of the I-shaped member. The two hook units hook to a side of the carriage rack and the second end of the I-shaped member is engaged with the support leg of the carriage rack.

The primary object of the present invention is to provide a connection device for connecting a bag to a side of a bicycle carriage rack, wherein the hook units and the sliding member can be adjusted so as to be connected to the bicycle rack of different sizes.

Another object of the present invention is to provide a connection device for connecting a bag to a side of a bicycle carriage rack, wherein the bag can be removed from the carriage rack to be used as a backpack while the lower part is smooth so that the users feel comfortable when using the bag as a backpack.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
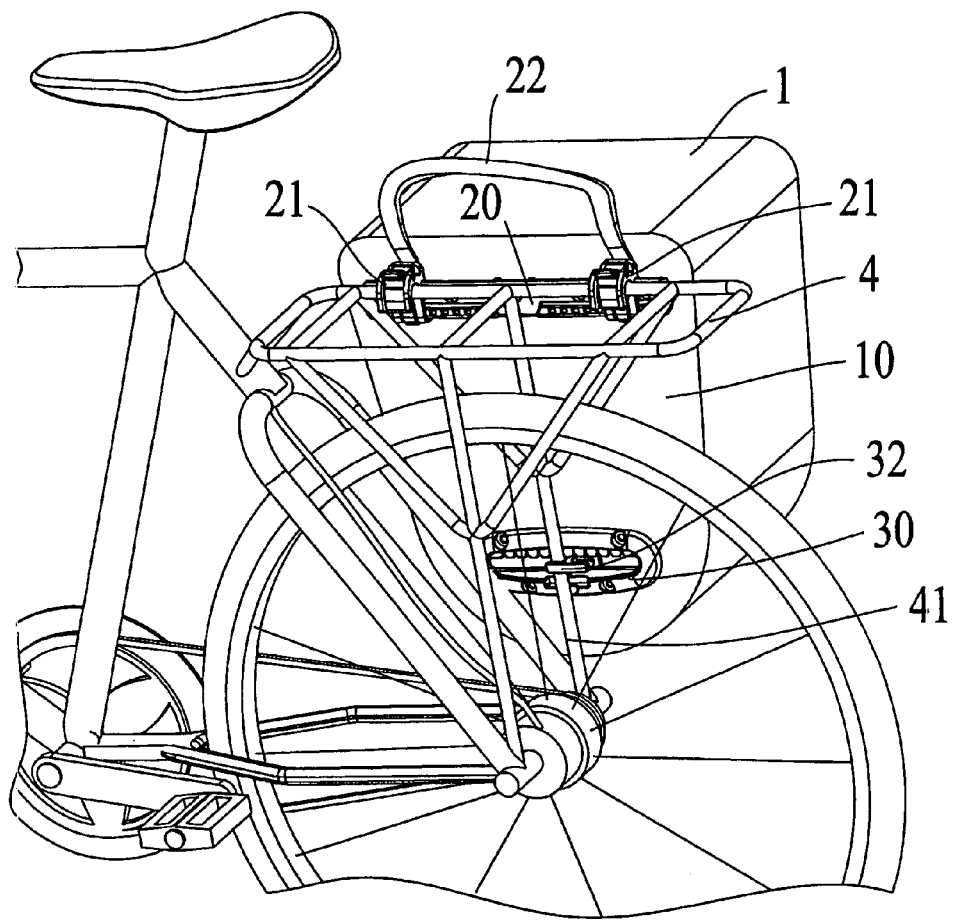
FIG. 1 is a perspective view to show that a bag is connected to a side of a bicycle carriage rack by the connection device of the present invention.
Figure 2:
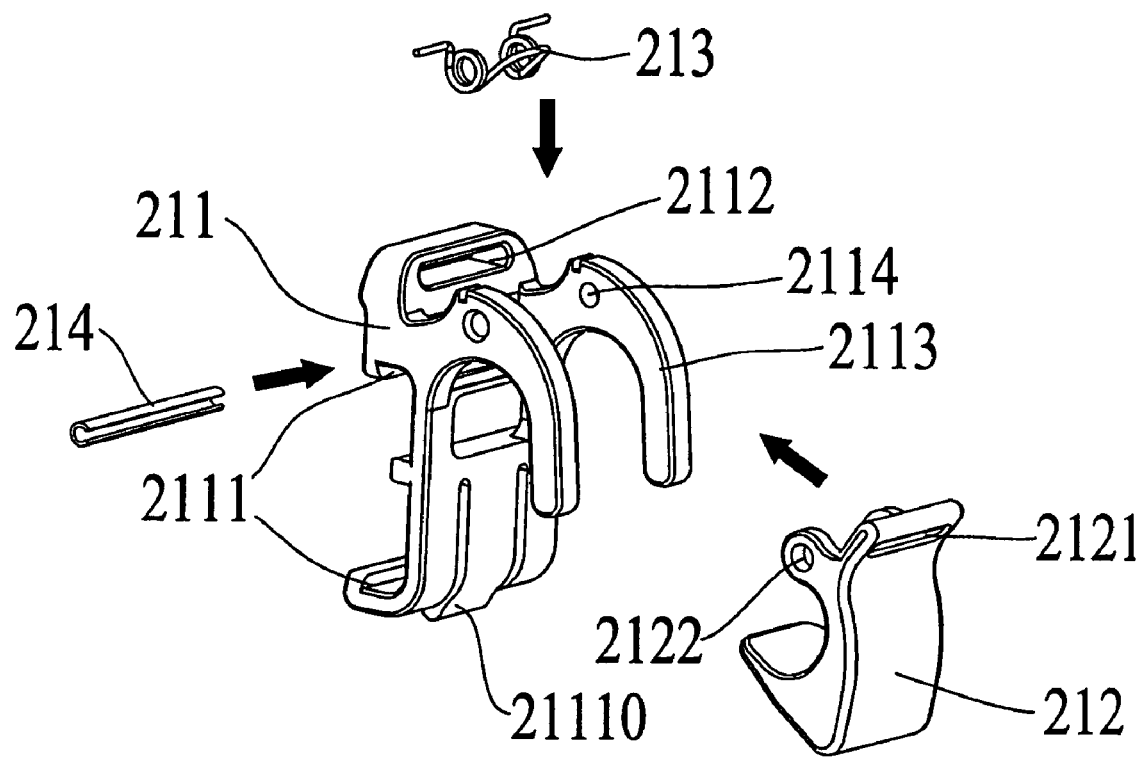
FIG. 2 is an exploded view to show the hook unit of the connection device of the present invention.
Figure 3:
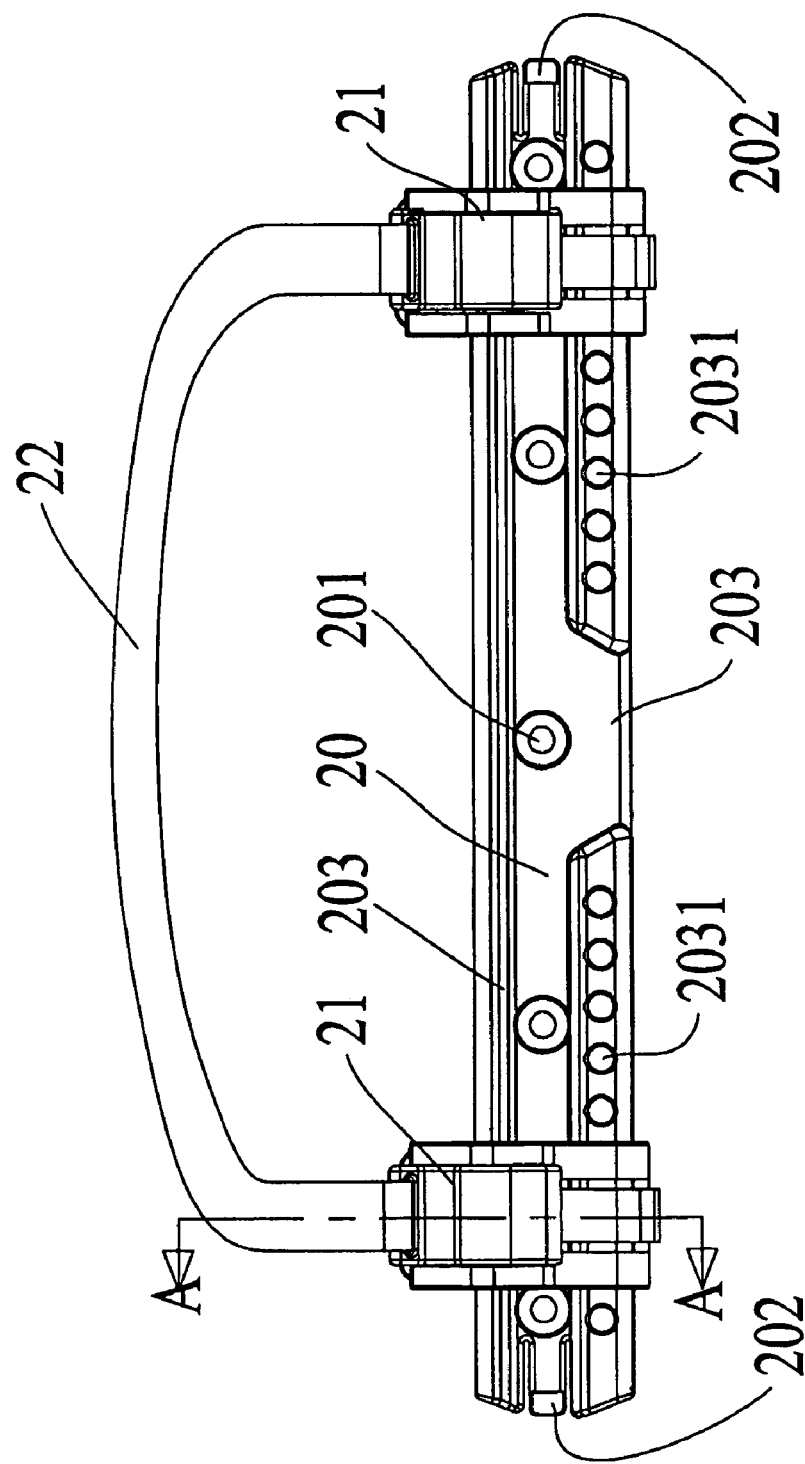
FIG. 3 shows the two hook units are positioned on the transverse bar on the back board.

Referring to FIGS. 1 to 4, the connection device for connecting a bag 1 to a side of a bicycle carriage rack 4 of the present invention comprises a back board 10 which is fixed to the back of the bag 1 and a transverse bar 20 is connected to an upper portion of the back board 10 by rivets 201 and a lower part is connected to a lower portion of the back board 10 by rivets 301. Two stops 202 are connected on two ends of the transverse bar 20 and two flanges 203 extend from a top and a lower side of the transverse bar 20. The transverse bar 20 has a plurality of positioning holes 2031 defined in one of the flanges 203.

Figure 4:
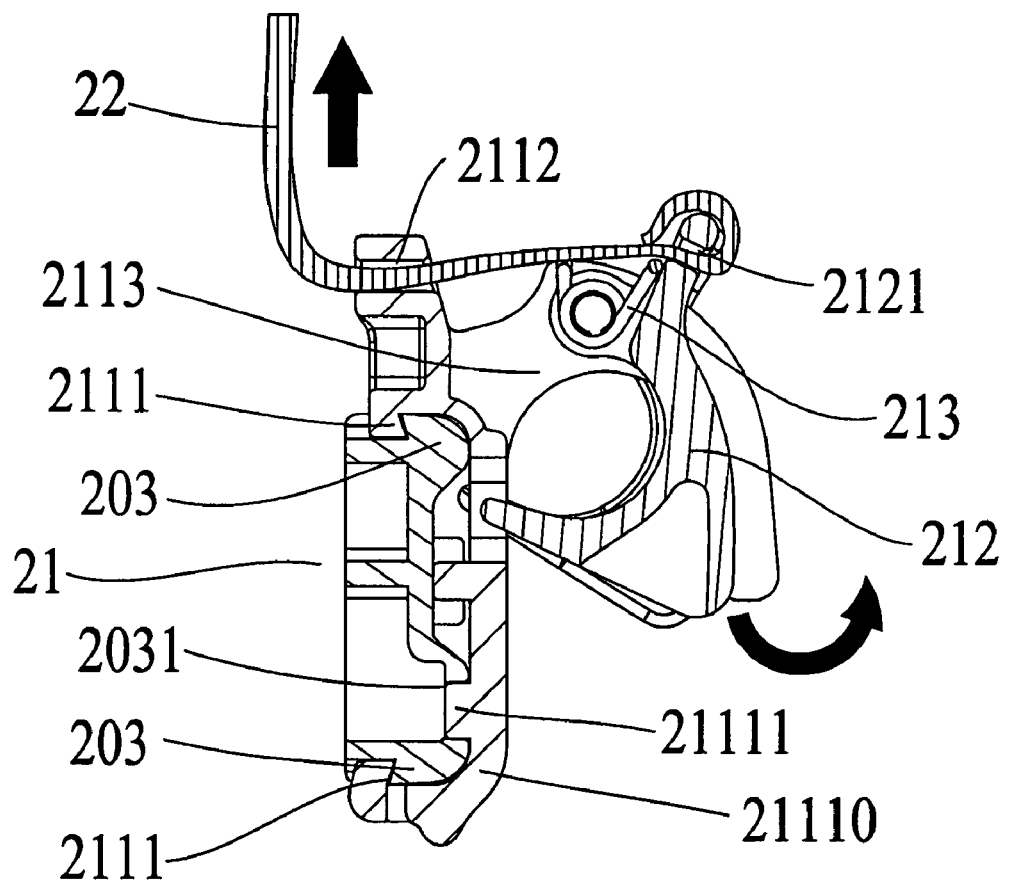
FIG. 4 is a cross sectional view taken along line A-A in FIG. 3.
Figure 5:
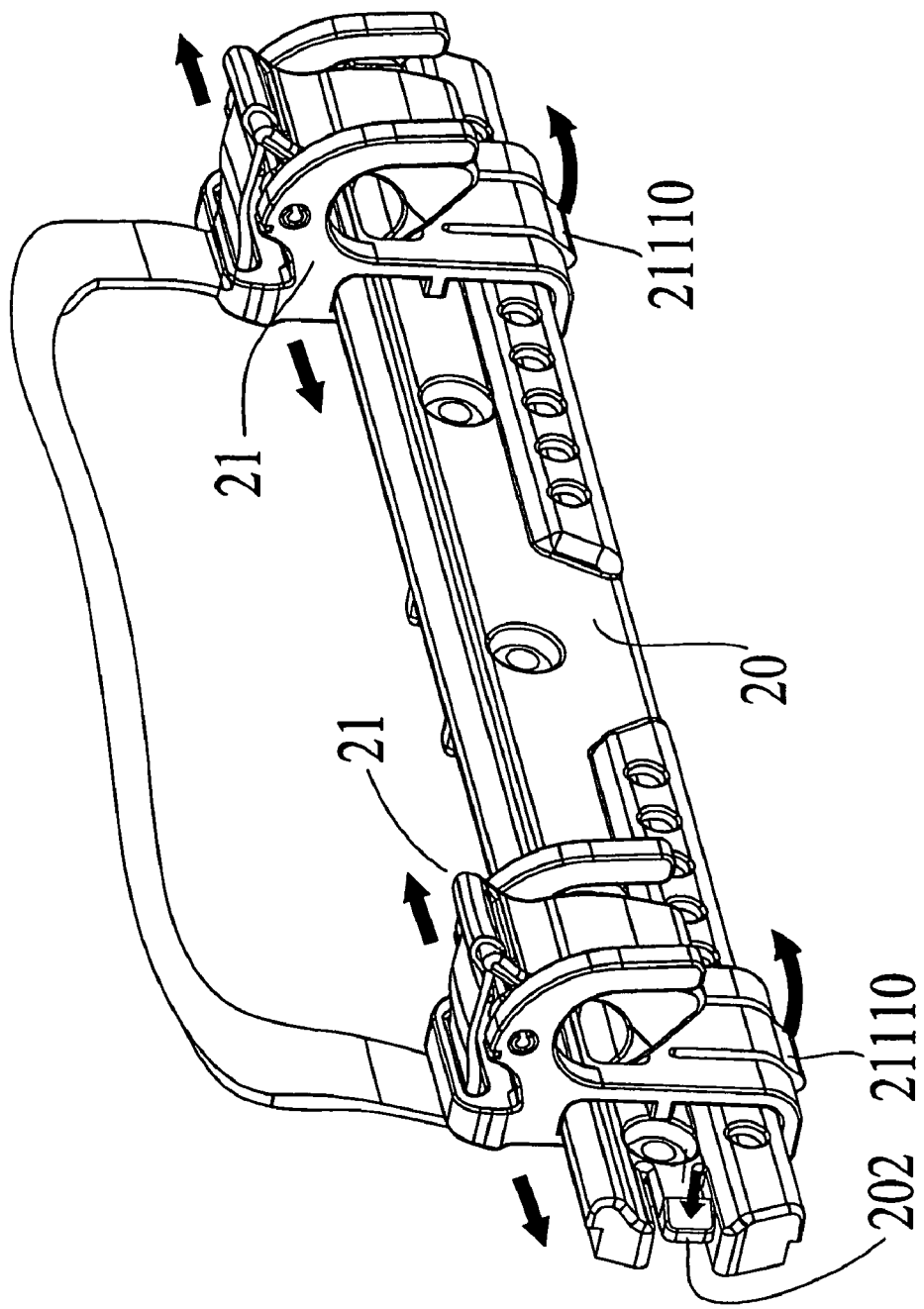
FIG. 5 shows that the two hook units can be moved along the transverse bar.
Figure 6:
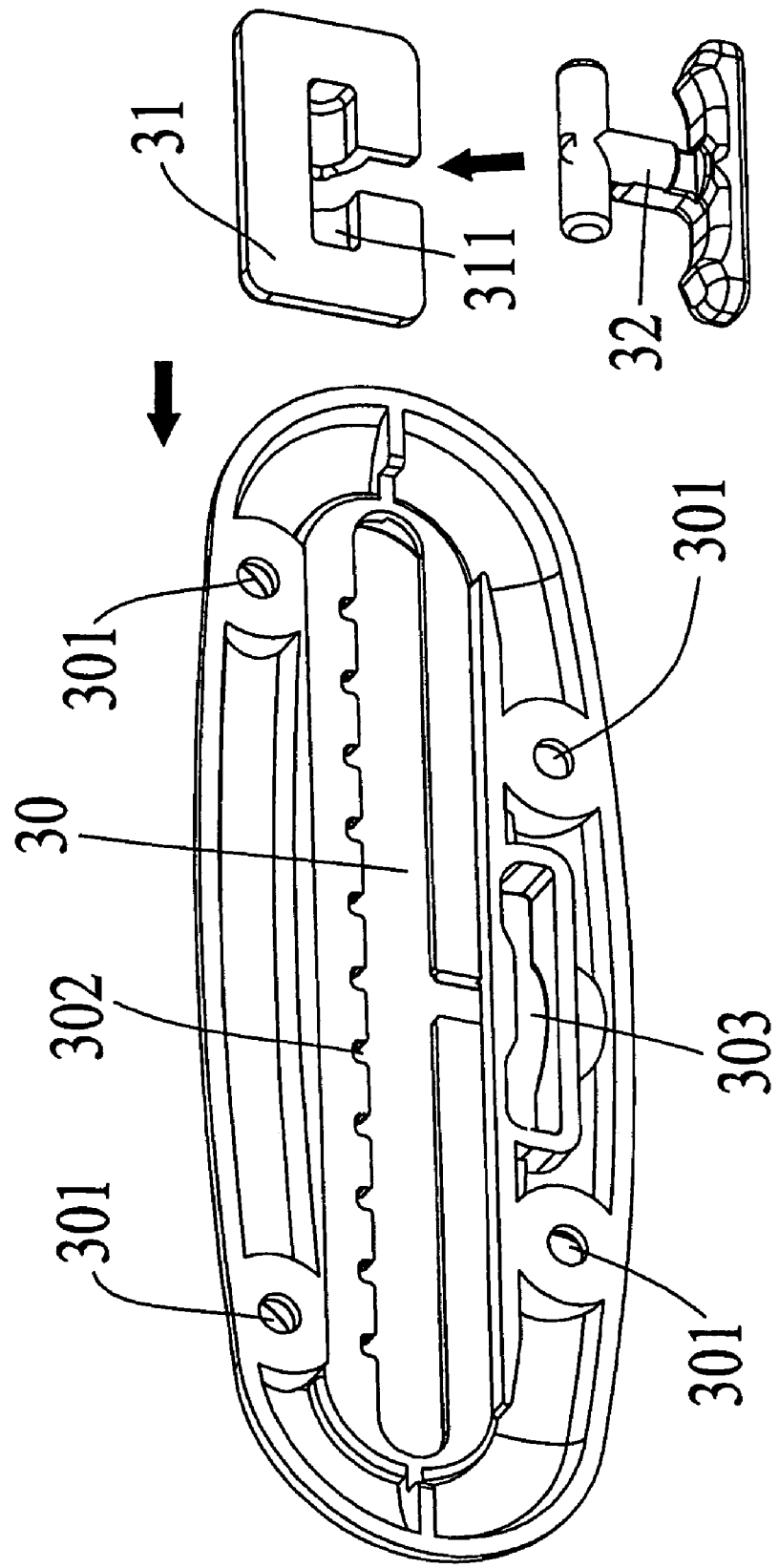
FIG. 6 is an exploded view to show the lower part and the sliding member and the I-shaped member of the connection device of the present invention.

Two hook units 21 are connected to the transverse bar 20 and each comprise a guide portion 211, a hook portion 212, a torsion spring 213 and a pin 214. The guide portion 211 includes two first grooves 2111 defined in a first side thereof and the two first grooves 2111 are located at an upper position and a lower position. The flanges 203 engaged with the first grooves 2111 such that the guide portions 211 of the two hook units 21 are connected to the transverse bar 20. The guide portion 211 of each hook unit 21 has a flexible plate 21110 located in the first groove 2111 at the lower position and a stud 21111 extends from the flexible plate 21110 corresponding thereto. The stud 21111 can be engaged with one of the positioning holes 2031 of the transverse bar 20 to position the guide portion 211 on the transverse bar 20 as shown in FIG. 5. A first slot 2112 is defined in a top end of each of the guide portions 211 has two pawl portions 2113 extend from a second side of each of the guide portions 211, wherein each pawl portion 2113 has a first pin hole 2114. Each of the hook portions 212 has a second slot 2121 and two lugs extend from a side of the hook portion 212, wherein each lug has a second pin hole 2122. The hook portion 212 is pivotably located between the two pawl portions 2113 by extending a pin 214 through the first and second pin holes 2114, 2122 and a torsion spring 213 located between the two lugs. A strap 22 is connected between the two hook units 21 and each of two ends of the strap 22 extends through the first and second slots 2112, 2121, and tied to the hook portion 212. As shown in FIG. 4, by pulling the strap 22, the hook portion 212 is pivoted about the pin 214 so that one side of the carriage rack 4 can be inserted into or removed from a space between the pawl portions 2113 and the hook portion 212.

Figure 7:
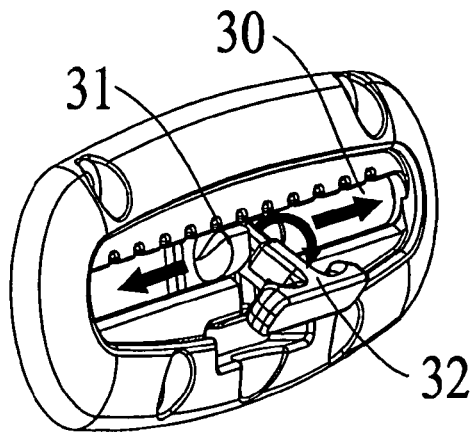
FIG. 7 shows that the I-shaped member is movable within the second groove of the lower part.
Figure 8:
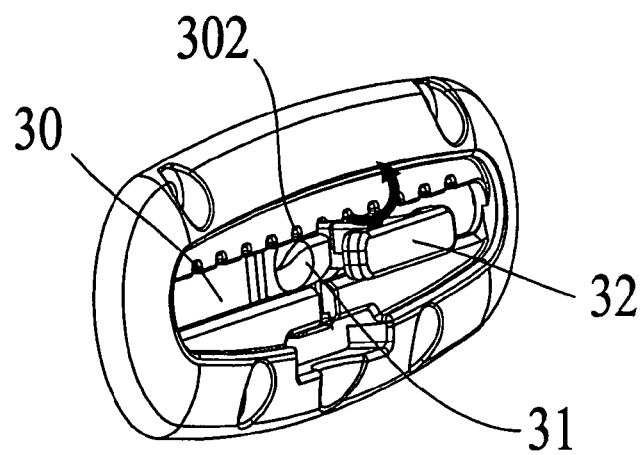
FIG. 8 shows that the I-shaped member is positioned within the second groove of the lower part.
Figure 9:
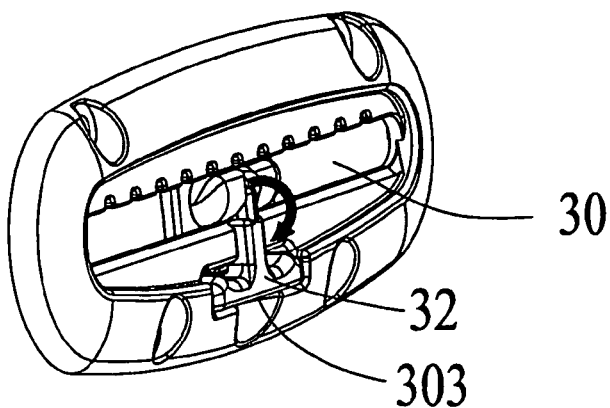
FIG. 9 shows that the second end of the I-shaped member is received in a T-shaped slot to make the lower part to be smooth at outside thereof.

As shown in FIGS. 6 to 9, the lower part connected to the lower portion of the back board 10 includes a second groove 30 defined therein. A plurality of positioning notches 302 are defined in a first inside of the second groove 30 and a T-shaped slot 303 is defined in a second inside of the second groove 30. A sliding member 31 is slidably engaged with the second groove 30 and has a recess 311 defined therein. An I-shaped member 32 has a first end pivotably engaged with the recess 311 and a second end of the I-shaped member 32 is connected to the first end by a shank, the second end of the I-shaped member 32 is pivotable about the first end of the I-shaped member 32. The sliding member 31 can be moved within the second groove 30 when the shank and the second end of the I-shaped member 32 is located horizontally as shown in FIG. 7. The sliding member 31 can be positioned relative to the second groove 30 by engaging the shank of the I-shaped member 32 with one of the positioning notches 302 as shown in FIG. 8. The second end of each of the I-shaped members 32 can be removably engaged with the T-shaped slot 303 to make the lower part to be smooth on the outside thereof. This makes the user to use the bag 1 as a backpack with have a protrusion on his or her back.

The second end of the I-shaped member 32 is engaged with the support leg 41_of the carriage rack 4 as shown in FIG. 1 so that the connection device can be cooperated with the bicycle carriage rack 4 of different sizes. When removing the bag 1 from the connection device, the strap 22 is pulled to pivot the hook portions 212 of the two hook units 21 and the flexible plates 21110 are pulled to remove the studs 21111 from the positioning holes 2031, the two hook units 21 can be slid to two ends of the transverse bar 20. The two stops 202 are pushed to allow the hook units 21 to be removed from the transverse bar 20 as shown in FIG. 5.

The connection device is easily operated to connect the bag 1 to the bicycle carriage rack 4 and the two hook units 21 and the sliding member 31 are adjustable so that the connection device can be used with the bicycle carriage racks 4 of different brands and sizes. The I-shaped member 32 can be pivoted to be received in the T-shaped slot 303 to allow the user to carry the bag 1 as a back pack comfortably.

While we have shown and described the embodiment in accordance with the present invention, it should be clear to those skilled in the art that further embodiments may be made without departing from the scope of the present invention.

What is claimed is:

1. A connection device comprising:
    a back board adapted to be fixed to a back of a bag;
    a transverse bar connected to an upper portion of the back board and two stops connected on two ends of the transverse bar, two flanges extending from a top and a lower side of the transverse bar;
    two hook units connected to the transverse bar and each comprising a guide portion, a hook portion, a torsion spring and a pin, the guide portion including two first grooves defined in a first side thereof and the two first grooves located at an upper position and a lower position, the flanges engaged with the first grooves, and
    a lower part connected to a lower portion of the back board and a second groove defined in the lower part, a plurality of positioning notches defined in a first inside of the second groove and a T-shaped slot defined in a second inside of the second groove, a sliding member slidably engaged with the second groove and having a recess defined therein, an I-shaped member having a first end pivotably engaged with the recess and a second end of the I-shaped member being pivotable about the first end of the I-shaped member.

2. The connection device as claimed in claim 1, wherein the transverse bar has a plurality of positioning holes defined in one of the flanges and the guide portion of each hook unit has a flexible plate located in the first groove at the lower position, a stud extends from the flexible plate corresponding thereto and is engaged with one of the positioning holes of the transverse bar to position the guide portion on the transverse bar.

3. The connection device as claimed in claim 1, wherein a first slot is defined in a top end of each of the guide portions has two pawl portions extend from a second side of each of the guide portions, each pawl portion has a first pin hole, each of the hook portions has a second slot and two lugs extend from a side of the hook portion, each lug has a second pin hole, the hook portion is pivotably located between the two pawl portions by extending a pin through the first and second pin holes and a torsion spring located between the two lugs, a strap is connected between the two hook units and each of two ends of the strap extends through the first and second slots and is tied to the hook portion.

4. The connection device as claimed in claim 1, wherein the sliding member is positioned relative to the second groove by engaging a shank of the I-shaped member with one of the positioning notches.

5. The connection device as claimed in claim 4, wherein a second end of each of the I-shaped members is removably engaged with the T-shaped slot.

* * * * *